Sept. 29, 1959  K. E. DRAEGER ET AL  2,906,704
RETAINING CATALYST FINES IN FLUID HYDROFORMING
Filed March 29, 1957
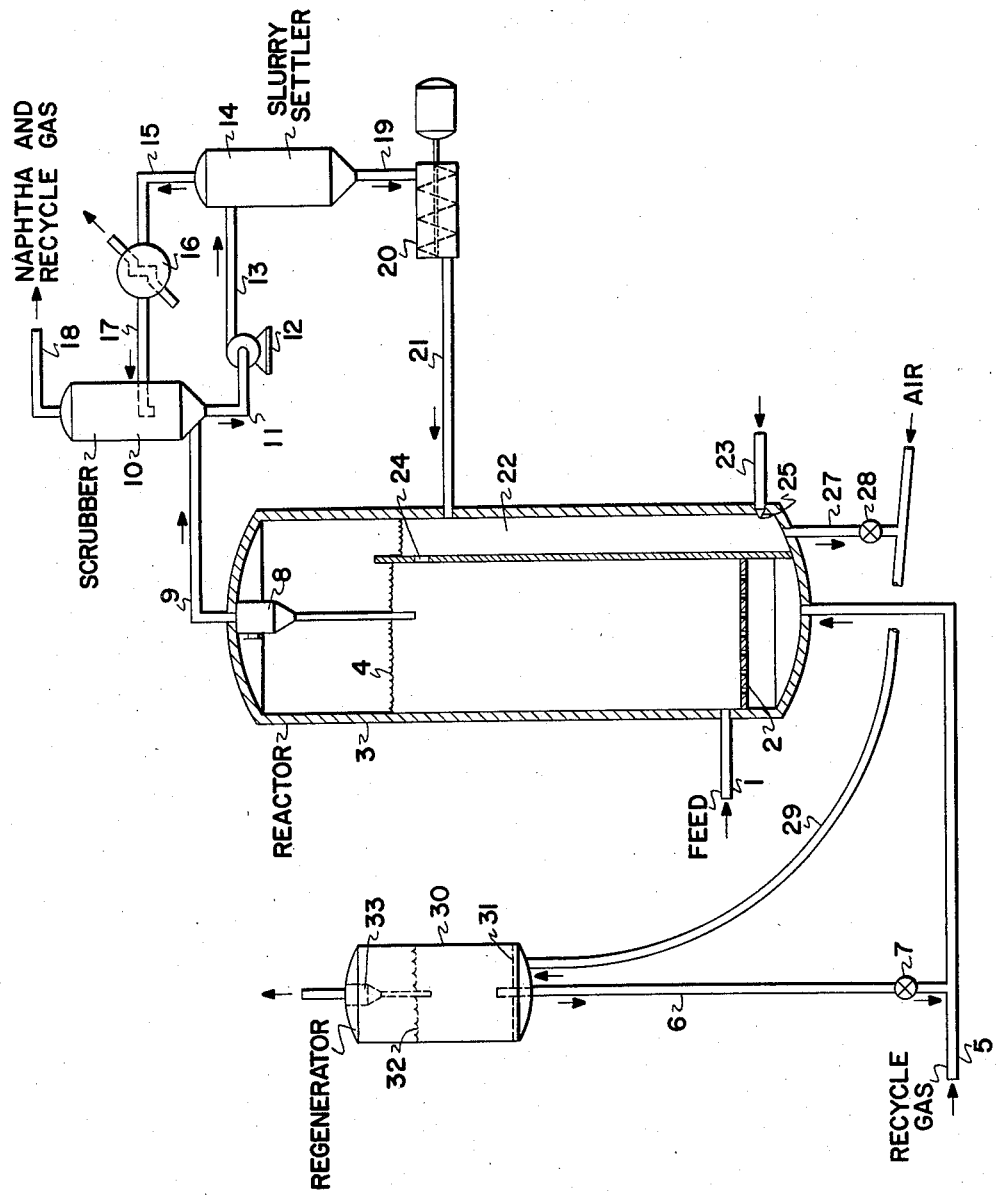
Kenneth Earl Draeger
Lloyd Arthur Nicolai   Inventors
By H. M. Feyrer   Attorney United States Patent Office 2,906,704
Patented Sept. 29, 1959.

2,906,704

RETAINING CATALYST FINES IN FLUID HYDROFORMING

Kenneth Earl Draeger and Lloyd Arthur Nicolai, Baton Rouge, La., assignors to Esso Research and Engineering Company, a corporation of Delaware Application March 29, 1957, Serial No. 649,480

12 Claims. (Cl. 208—150)

This invention pertains to the catalytic conversion of hydrocarbons and particularly to an improved process for the recovery of catalyst particles entrained with vaporous reaction products from a hydrocarbon conversion reactor operating in accordance with the fluidized solids technique. By the invention catalyst fines in the reactor overhead which pass the reactor cyclones are concentrated in the minimum operable amount of polymer and this slurry is returned to the upper part of the spent catalyst stripper.

This invention will be described hereinbelow as applied to a fluid hydroforming operation. It will be understood, however, that it is equally applicable to fluid catalytic cracking or other hydrocarbon conversion operations employing the fluidized solids technique.

Hydroforming is a well known and widely used process for treating hydrocarbon fractions boiling within the motor fuel or naphtha range to upgrade the same or increase the aromaticity and improve the antiknock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are usually carried out in the presence of hydrogen or hydrogen-rich recycle gas at temperatures of 750–1150° F. in the pressure range of about 50–3000 lbs. per sq. inch and in contact with such catalysts as molybdenum oxide, chromium oxide, or, in general, oxides or sulfides of metals of groups IV, V, VI, VII and VIII of the periodic system of elements alone or generally supported on a base or spacing agent such as alumina gel, precipitated alumina or zinc aluminate spinel. A good hydroforming catalyst is one containing about 10 wt. percent molybdenum oxide upon an aluminum oxide base prepared by heat treating a hydrated aluminum-oxide or upon a zinc aluminate spinel.

Fluid hydroforming is a process in which naphtha vapors are passed continuously through a dense, fluidized bed of hydroforming catalyst particles in a reaction zone and in which spent catalyst is withdrawn from the dense bed and passed to a separate regeneration zone where inactivating carbonaceous deposits are removed. The regenerated catalyst is then returned to the main reaction vessel. Fluid hydroforming has several fundamental advantages over fixed bed hydroforming such as (1) the operations are continuous, (2) the vessels and equipment can be designed for single rather than dual functions, (3) the reactor temperature is constant and simulates isothermal fixed bed operations, and (4) the regeneration or reconditioning of the catalyst may be readily controlled.

In the conduct of hydrocarbon conversion operations wherein hydrocarbon vapors are passed through a dense, fluidized, liquid-simulating bed of finely divided catalyst particles, small amounts of catalyst particles become entrained in the vaporous reaction products and even after passage through cyclone separators or the like which remove the major proportion of the entrained catalyst particles, small residual amounts of catalyst having a particle size smaller than about 10 microns remain in the product vapor stream. It is desirable for the economical operation of this process to recover this residual catalyst from the product vapors.

In addition it has been determined that it is highly desirable to maintain a significant proportion of fines in the catalyst fluid bed in order to obtain high catalyst efficiency. When catalyst fines passing the reactor and regenerator cyclones are not returned to the unit, the percentage of coarser catalyst particles increases as does the density of the fluid bed. It is known that this produces a decreased catalyst utilization. It has been proposed in U.S. Patent 2,663,676 to recover this catalyst by quenching or partially condensing the product vapors from the reactor to separate the residual catalyst as a slurry, concentrating and, if desired, filtering the slurry, reslurrying the recovered catalyst in fresh feed and introducing the slurry into the upper part of the reactor. In this way not only is the catalyst recovered but also polymer and other polycyclic compounds that are adsorbed upon the catalyst particles are stripped from the catalyst in the disperse phase at the top of the reactor and thus do not produce the high coke deposition encountered when such fines are introduced with the fresh feed to the bottom of the reactor. Unfortunately, however, fines thus returned to the reactor tend to be promptly entrained in the product vapors rather than intermixed with the catalyst dense bed.

According to the present invention it has been found that an improved system results when the fines concentrated in the minimum amount of polymer are returned to the upper part of the reactor catalyst withdrawal stripper. This stripper is operated at a relatively low velocity (about 0.5 ft./sec.) and essentially all the fines pass down the stripper, are fully stripped by passing the full length of such column, and are then passed to the regenerator. Thus recirculation of catalyst fines between the fines recovery system and the reactor disperse phase is avoided. By the present process the fines are returned after regeneration to the lower part of the reactor fluid bed and thus contribute to the fullest to maintaining the desired fines content in such fluid bed. Additionally, an attriter may be located near the bottom of the reactor catalyst withdrawal stripper to increase fines content if desired. This attriter can be supplied with ordinary stripping gas, i.e., steam can be used at 600 p.s.i.g. Since fine catalyst of less than 40 micron size is more expensive to prepare than coarser catalyst, fresh catalyst is often supplied deficient in fines. The attriter can thus be used to bring the catalyst in the system to the proper fines content.

Another advantage of returning catalyst fines recovered from the reactor overhead to the stripper rather than to the reactor disperse phase is that the catalyst particles which are too small to economically be retained in the system can be allowed to pass out through the cyclones in the regenerator. Previous systems did not pass these fines to the regenerator at all and the slurry recovery from the reactor caught extremely fine and fine particles more or less indiscriminately.

This invention will be more fully understood by reference to the accompanying drawing in which the fines recovery and control system for hydroforming is illustrated diagrammatically. The feed stock, preheated to substantially reaction temperature is passed through line 1 to distribution nozzles arranged at or just above distribution grid 2 near the bottom of reactor vessel 3. This feed stock may be a virgin naphtha, a cracked naphtha, a Fischer-Tropsch naphtha or the like. When used for catalytic cracking, the feed stock would be a gas oil or similar high boiling feed stock.

The reactor 3 is charged with a mass of finely divided catalyst particles fluidized above grid 2, and having an upper level 4. A stream of hot hydrogen-containing recycle gas is supplied from the recycle gas-naphtha separation system, not shown, to line 5. Hot regenerated catalyst is added to this stream of gas from line 6 through valve 7 and the combined stream is passed to the bottom of reactor 3 below baffle plate 2. In some cases it may be desirable to recycle regenerated catalyst to the reactor dense bed without pretreatment or without partial reduction from the completely oxidized condition achieved in the regenerator. In this case, care is taken to avoid contact of the hot regenerated catalyst with hydrogen or other reducing gas in the transfer line between the regenerator and reactor as by using only steam or inert gas such as nitrogen as the stripping and conveying gas. Also, if desired, a stream of reactor catalyst may be supplied to the regenerated catalyst transfer line to cool or control the temperature of the catalyst undergoing partial reduction or pretreatment.

Reaction products are taken overhead through cyclone separator or separators 8 or the like which remove most but not all of the entrained catalyst particles. The reaction products are then passed through line 9 to product recovery equipment. This equipment is well known in the art and not a part of this invention and so only the catalyst fines recovery system will be shown. In scrubber 10 a partial quench is utilized to condense only the heavy polymer and with such polymer droplets the catalyst fines. The slurry formed is then passed through line 11 to pump 12. This pump pressurizes the liquid so that it may be passed through line 13 to slurry settler 14 and from there through line 15, cooler 16 and line 17 back to spray nozzles in the scrubber 10. The temperature and amount of this quench oil are controlled so as to cool the reaction product vapors to just below the condensation point of the heavy polymers formed in the hydroforming reaction vessel. The uncondensed reaction products are passed to recycle gas separation and products purification equipment through line 18.

From slurry settler 14 the concentrated slurry is passed through line 19 to slurry recycle pump 20 and thence through line 21 to the upper part of catalyst withdrawal stripper 22. Stripping gas is introduced through line 23 at a fluidization rate lower than that in the main fluid bed in the reactor. Thus the fines so introduced will pass down the withdrawal stripper with the catalyst stream passing from the main bed through withdrawal port 24. This stripper column is open at the top, and stripping gases pass directly into the disperse phase region of the reactor. If desired, an attriter 25 supplied with steam through line 23 can be installed to reduce catalyst particle size on the stream descending in the stripper. In this case, the stripping steam is also used for catalyst attrition. This attriter may be of any of the well known types, supersonic, Venturi type, or ejector.

From the bottom of stripper 22 stripped catalyst passes through line 27 and valve 28, to regeneration air line 29 through which it passes into the bottom of regenerator 30. A fluid bed of catalyst is maintained above baffle plate 31 having an upper level 32. From the regenerator regeneration gases pass through cyclone separators 33 to heat exchange means. Uneconomically small fines are intentionally allowed to pass from the system through cyclones which have been chosen so as to return the desired size fines only to the regenerator dense bed. From the bottom of the regenerator regenerated catalyst is passed through line 6 and valve 7 back to the recycle gas line for transfer to the reactor as previously described.

In order to more fully explain the invention, the following example is set forth with the understanding that it is merely illustrative of the invention and that the invention is not restricted to the specific details enumerated therein.

*Example*

A 180° F. to 350° F. boiling range virgin naphtha is hydroformed to 97 Research Clear octane number. The catalyst comprises 10 wt. percent molybdic oxide supported on an activated alumina support stabilized by the inclusion of 2.0 wt. percent silica thereon. Reactor pressure is 200 p.s.i., recycle gas rate is 5000 s.c.f./b., and the temperature of the catalyst fluid bed is 940° F. Space velocity of the naphtha feed is 0.30 pound of oil per pound of catalyst in the reactor and catalyst circulation to the regenerator is 1.0 pound of catalyst per pound of oil. The regenerator is operated at a temperature of 1100° F. and a pressure of 200 p.s.i.g. Catalyst fines recovery from the hydroformer reaction products is 0.001 lb. per lb. of oil supplied to the reactor. These fines concentrated to 0.24 lb./gal. which are introduced to the withdrawal stripper lower the temperature in such stripper 20° F. below the temperature of the main catalyst bed in the reactor and increase the velocity of steam in the stripper by 0.04 ft./sec. The velocity of the steam stripping gases is 0.5 ft./sec. and of the vapors through the main hydroformer catalyst bed is 0.9 ft./sec. The attriter operates on 600 p.s.i.g. steam to maintain an 8 to 15 wt. percent concentration of fines 0–40 microns in size.

It is to be understood that this invention is not limited to the specific example above which has been offered merely as an illustration, and that modifications may be made without departing from the spirit of this invention.

What is claimed is:

1. In a process for the conversion of hydrocarbons in contact with finely divided catalyst particles in accordance with the fluidized solids technique wherein hydrocarbon feed stock is contacted with a dense, fluidized bed of catalyst particles in the lower portion of the conversion zone and in which a stream of catalyst is withdrawn from the dense fluidized bed through a stripping zone for circulation to the regenerator the improvement which comprises withdrawing a stream of vaporous reaction products containing residual amounts of entrained catalyst particles from the top of the conversion zone, partially condensing the product vapors to separate the residual catalyst as a slurry in heavy product and recycling the recovered residual catalyst slurry to the upper part of the reactor catalyst withdrawal and stripping zone.

2. The process as in claim 1 in which the velocity of the gases in the catalyst withdrawal and stripping zone is 0.2 to 1.0 feet/second.

3. In a process for the conversion of hydrocarbons in contact with finely divided catalyst particles in accordance with the fluidized solids technique wherein hydrocarbon feed stock is contacted with a dense, fluidized bed of catalyst particles in the lower portion of the conversion zone and in which a stream of catalyst is withdrawn through a stripping zone for circulation to the regenerator the improvement which comprises withdrawing a stream of vaporous reaction products containing residual amounts of entrained catalyst particles from the top of the conversion zone, partially condensing the product vapors to separate the residual catalyst as a slurry in heavy product, concentrating said slurry to 0.01 to 1.0 pound of catalyst per gallon of slurry, and recycling the concentrated residual catalyst slurry to the upper part of the reactor catalyst withdrawal and stripper zone.

4. The process as in claim 3 in which the velocity of the gases in the catalyst withdrawal and stripping zone is 0.2 to 1.0 ft./second.

5. The process as in claim 3 in which the velocity of the gases in the catalyst withdrawal and stripping zone is 0.2 to 1.0 feet/second and the velocity of the fluidizing gas in the reactor is higher than that in stripping zone and is in the range of 0.5 to 2.0 feet/second.

6. In a process for hydroforming hydrocarbon fractions boiling within the motor fuel range in contact with finely divided hydroforming catalyst particles in accordance with the fluidized solids technique wherein hydrocarbon feed stock is contacted with a dense, fluidized bed of hydroforming catalyst particles in the lower portion of the hydroforming reaction zone and in which a stream of catalyst is withdrawn from the dense fluidized bed through a stripping zone for circulation to the regenerator, the improvement which comprises withdrawing a stream of vaporous reaction products containing residual amounts of entrained catalyst particles from the top of the conversion zone, partially condensing the product vapors to separate the residual catalyst as a slurry in heavy product and recycling the recovered residual catalyst slurry to the upper part of the catalyst withdrawal and stripping zone.

7. The process as in claim 6 in which the velocity of the gases in the catalyst withdrawal and stripping zone is 0.2 to 1.0 feet per second.

8. The process as in claim 6 in which the velocity of the gases in the catalyst withdrawal and stripping zone is 0.2 to 1.0 feet/second and the velocity of the fluidizing gas in the reactor is higher than that in the stripping zone and in the range of 0.5 to 2.0 feet/second.

9. In a process for hydroforming hydrocarbon fractions boiling within the motor fuel range in contact with finely divided hydroforming catalyst particles in accordance with the fluidized solids technique wherein hydrocarbon feed stock is contacted with a dense, fluidized bed of hydroforming catalyst particles in the lower portion of the hydroforming reaction zone and in which a stream of catalyst is withdrawn through a stripping zone for circulation to the regenerator, the improvement which comprises withdrawing a stream of vaporous reaction products containing residual amounts of entrained catalyst particles from the top of the conversion zone, partially condensing the product vapors to separate the residual catalyst as a slurry in heavy product, concentrating said slurry to 0.01 to 1.0 pound of catalyst per gallon of slurry, and recycling the concentrated residual catalyst slurry to the upper part of the reactor catalyst withdrawal and stripping zone.

10. The process as in claim 8 in which the velocity of the gases in the catalyst withdrawal and stripping zone is 0.2 to 1.0 feet/second.

11. The process as in claim 1 in which the vaporous reaction products withdrawn from the top of the conversion zone contain fine catalyst of a particle size smaller than about 10 microns.

12. The process as in claim 6 in which the vaporous reaction products withdrawn from the top of the conversion zone contain fine catalyst of a particle size smaller than about 10 microns.

References Cited in the file of this patent

UNITED STATES PATENTS

| | | |
|---|---|---|
| 2,663,676 | Cardwell | Dec. 22, 1953 |
| 2,689,209 | Blair | Sept. 14, 1954 |
| 2,859,175 | Smith | Nov. 4, 1958 |